June 7, 1927.

C. P. HOEFLER 1,631,130

SHIELD FOR AUTOMOBILE HEADLIGHTS

Filed April 28, 1924

Inventor

Carl P. Hoefler.

By L. N. Gillis

Attorney

June 7, 1927.  
C. P. HOEFLER  
1,631,130  
SHIELD FOR AUTOMOBILE HEADLIGHTS  
Filed April 28, 1924.  2 Sheets-Sheet 2
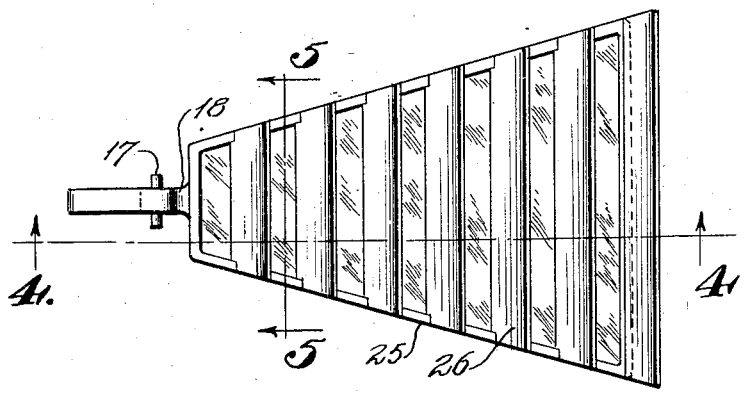
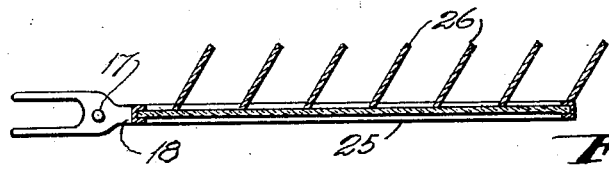
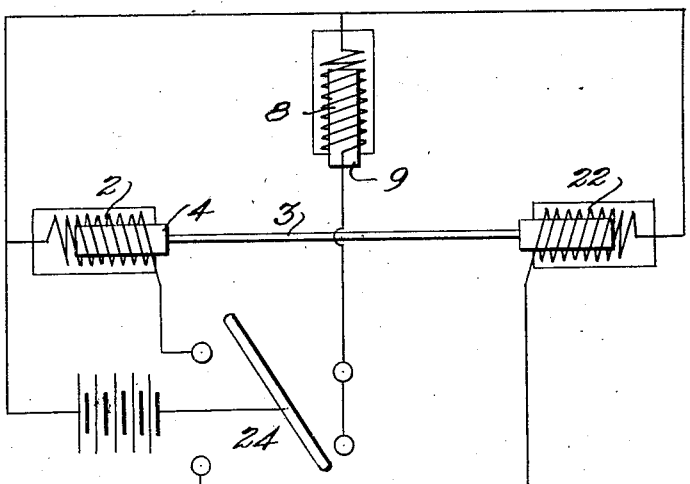
Inventor  
Carl P. Hoefler  
By L. N. Gillis  
Attorney Patented June 7, 1927.

1,631,130

UNITED STATES PATENT OFFICE.

CARL PERRY HOEFLER, OF SYRACUSE, NEW YORK.

SHIELD FOR AUTOMOBILE HEADLIGHTS.

Application filed April 28, 1924. Serial No. 709,506.

My invention relates to improvements in shields for perventing glare from automobile headlights and the objects of my improvement are, first, to provide a headlight shield for the elimination of glare; second, to provide electric means for the control of the shield; and third, to provide an appropriate dash-board switch.

I attain these objects by the means illustrated in the accompanying drawings, in which—

Figure 3 is a face view of the screen or shutter.

Figure 4 is a section on the line 4—4 of Figure 5.

Figure 5 is an enlarged section on the line 5—5 of Figure 3.

Figure 6 is a diagram showing the wiring of the invention.

Figure 1:
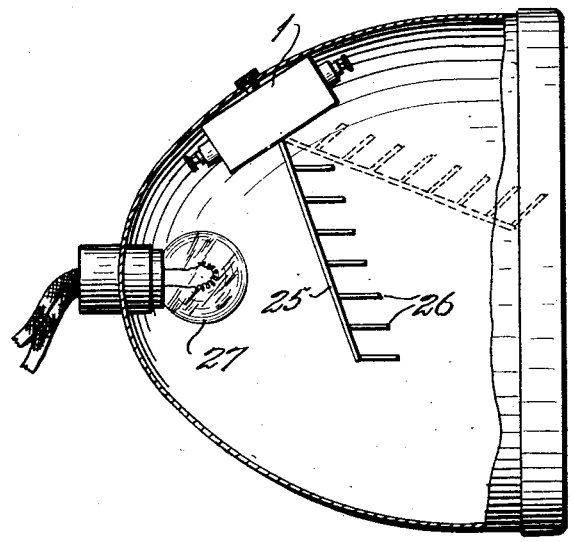
Figure 1 is a section through a headlight showing the device in position.
Figure 1:
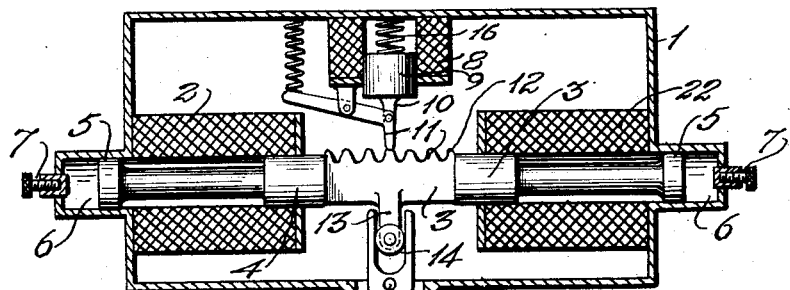
Figure 2:
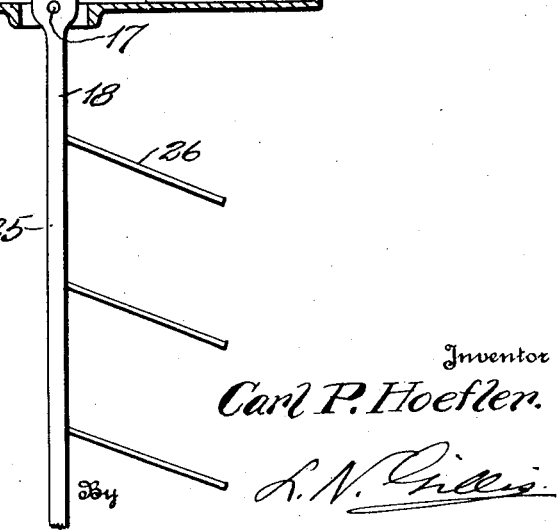
Figure 2 is an enlarged section through the casing containing the operating mechanism of the device.

The casing 1 encloses the mechanism for controlling the elevation of the shield 25 mounted upon the shaft 18. In one position of the double throw switch 24, an electric current flows in parallel through the two solenoids 2 and 8. As the current passes through solenoid 8, the core 9 is drawn into the coil and by means of the link 10 withdraws the dog 11 from the teeth 12 upon the shaft 3. Current passing through the solenoid 2 acts upon its core 4 and draws up the shaft 3. A lateral arm 13 projecting from the shaft 3 carries a pin 14 which works between fingers terminating the shaft 18. Since the shaft 18 is pivoted at 17, the upward movement of the shaft 3 causes a lowering of the shield 25 mounted upon the outer end of the shaft 18.

The parallel arrangement of the vanes 26 prevents rays of light from the lamp 27 striking in an upward direction, and even directs them downwardly when the shield is dropped to its lowest position.

When the dash switch 24 is thrown into a neutral position, the spring 16 forces the dog 11 into the rack 12 and the position of the shield 25 becomes fixed.

In the second position of the switch 24, the current passes in parallel to solenoids 8 and 22. Again the vertical shaft 3 is unlocked by the solenoid 8, and the solenoid 22, acting in the same manner as the solenoid 2, but in a reverse direction, draws the vertical shaft 3 down and so elevates the shield 25 until the light rays may be directed upwardly as far as the operator may desire.

Air chambers 6, 6 with escape valves 7, 7 are arranged at the ends of the shaft 3, and piston heads 5, 5 are fiitted to the chambers. The action of the vertical shaft 3 is retarded by this means to permit of finer control.

While the preferred arrangement is illustrated, it is obvious that the mechanism and shield could be situated in front of the headlight casing with similar results.

I claim:

A glare eliminating device having in combination a casing, a solenoid in the upper part of said casing, a second solenoid in the lower part of said casing, cores in both of said solenoids, a shaft connecting said cores and passing thru the center thereof, pistons at both ends of said shaft, air chambers surrounding said pistons, small external openings in said chambers adjusting pins regulating the size of said openings, an arm projecting laterally from said shaft, a pin at the end of said projection, fingers slidingly engaging said pin, a rod extending from said fingers, a pin rotatably attaching said rod to said casing, an end of said rod projecting from said casing, a transparent plate mounted upon said projecting end, vanes rising at an angle from said plate, a third solenoid mounted in said casing opposite to said projecting rod, a core for said third solenoid, a link attached to said core, a dog controlled by said link, a spring attached to the rear end of said dog, teeth projecting from said shaft and engagable by said dog, a system of wiring whereby said third solenoid may be thrown in parallel with either of said first or second solenoids, a dash switch controlling said wiring system, and means for attaching said casing to the housing of a headlight.

In testimony whereof, I affix my signature.

CARL P. HOEFLER.